(12) United States Patent
Numoto et al.

(10) Patent No.: US 7,413,216 B2
(45) Date of Patent: Aug. 19, 2008

(54) GAS GENERATOR FOR AN AIR BAG

(75) Inventors: Kenji Numoto, Himeji (JP); Yasunori Iwai, Shijyonawate (JP); Naoki Matsuda, Himeji (JP); Masato Hirooka, Hyogo (JP)

(73) Assignee: Daicel Chemical Industries, Ltd., Sakai-shi, Osaka (JP)

( * ) Notice: Subject to any disclaimer, the term of this patent is extended or adjusted under 35 U.S.C. 154(b) by 454 days.

(21) Appl. No.: 11/063,570

(22) Filed: Feb. 24, 2005

(65) Prior Publication Data

US 2005/0206144 A1    Sep. 22, 2005

Related U.S. Application Data

(60) Provisional application No. 60/548,862, filed on Mar. 2, 2004.

(30) Foreign Application Priority Data

Feb. 27, 2004    (JP)    ............................. 2004-052629

(51) Int. Cl.
*B60R 21/26*    (2006.01)
(52) U.S. Cl. ...................... 280/736; 280/741
(58) Field of Classification Search ................ 102/530, 102/531; 280/736, 741
See application file for complete search history.

(56) References Cited

U.S. PATENT DOCUMENTS

| | | | | |
|---|---|---|---|---|
| 5,219,178 A | * | 6/1993 | Kobari et al. ............... | 280/736 |
| 5,564,743 A | * | 10/1996 | Marchant .................... | 280/741 |
| 5,970,880 A | * | 10/1999 | Perotto ....................... | 102/531 |
| 6,237,498 B1 | * | 5/2001 | Winterhalder et al. ....... | 102/530 |
| 6,314,888 B1 | * | 11/2001 | Muller et al. ............... | 102/530 |
| 6,364,354 B1 | * | 4/2002 | Nakashima et al. ......... | 280/736 |
| 6,474,685 B1 | * | 11/2002 | Meixner et al. ............. | 280/741 |
| 6,485,051 B1 | * | 11/2002 | Taguchi et al. ............. | 280/736 |
| 2002/0190511 A1 | * | 12/2002 | Watase et al. ............... | 280/740 |
| 2004/0244632 A1 | * | 12/2004 | Matsuda ..................... | 102/530 |
| 2005/0098988 A1 | * | 5/2005 | Smith ......................... | 280/735 |

FOREIGN PATENT DOCUMENTS

| EP | 1234732 A1 | 8/2002 |
|---|---|---|
| EP | 1568548 A1 | 8/2005 |

\* cited by examiner

*Primary Examiner*—Ruth Ilan
(74) *Attorney, Agent, or Firm*—Birch, Stewart, Kolasch & Birch, LLP (57) ABSTRACT

A dual-type gas generator for inflating air bags is provided in which a first igniter structure having a first combustion chamber accommodating a first gas generating material and a second igniter structure having a second combustion chamber accommodating a second gas generating material both exhaust, when activated, to exhaust gas to a common filter chamber. When the igniter structures are intended to be activated separately and with a time lag, gas generated in the first chamber often flows into the second chamber and may ignite the second gas generating material. This malfunction can be prevented by various flame-transferring preventing structures that preclude direct flow of gas from the first chamber into the second chamber through the common filter chamber.

16 Claims, 9 Drawing Sheets

Gas Generator for an Air Bag

RELATED APPLICATIONS

This Nonprovisional application claims priority under 35 U.S.C. § 119(e) on U.S. Provisional Application No. 60/548,862 filed on Mar. 2, 2004 and under 35 U.S.C. § 119(a) on Patent Application No. 2004-52629 filed in Japan on Feb. 27, 2004, the entire contents of which are hereby incorporated by reference.

BACKGROUND OF THE INVENTION

1. Field of the Invention

The present invention relates to dual-type gas generators for air bags used in air bag systems for automobiles.

2. Description of Related Art

So-called dual-type gas generators are used for the purpose of regulating the rate of inflation or the degree of tension of an air bag in response to, for example, the magnitude of the impact at a vehicle collision and the physique of the passenger.

In dual-type gas generators, two combustion chambers (gas generating portions) are independently operated to adjust the amount of gas generated and the discharging speed of that gas to an air bag. Such generators are sometimes susceptible to a situation in which, as a result of the ignition of the gas generating agent of one combustion chamber, the gas generating agent of the other combustion chamber is ignited. This constitutes a malfunction.

Although such a malfunction can be prevented by completely separating the two combustion chambers and the gas discharge passages, this solution results not only in an increase in the number of component parts but also an increase in the weight and the scale of the gas generator itself, which contrasts with the consumer demand for the compacting and weight-reduction thereof.

In U.S. Pat. No. 5,970,880, the combustion chambers are arranged in both ends of a housing, a safety valve 26 is provided in the right side combustion chamber to prevent the effect of the left side combustion chamber from transferring to the right side through a communication hole 6.

However, in order to ensure that the gas of the right side combustion chamber is discharged through the communication hole 6 to a central filter chamber and to prevent the gas from passing through the left side combustion chamber, the plate thickness of a section 28 and the width or plate thickness of a section 39 of the safety valve 26 should be adjusted and, depending on differences in an amount of a gas generating agent charged therein and a size of the communication hole 6, this should be re-adjusted.

SUMMARY OF THE INVENTION

The present invention provides a dual-type gas generator for air bags, having a simplified structure, which prevents the malfunction of unwanted ignition and combustion of a gas generating agent in one combustion chamber of the generator because of the intentionally induced combustion of a gas generating agent in another combustion chamber.

The invention provides a gas generator for an air bag, comprising: first and second ignition means; a combustion chamber including a gas generating agent, the first and second ignition means capable of being activated separately from each other with a time lag, to produce combustion gas from their respectively associated combustion chambers to inflate an air bag, said gas generator having a structure including a gas discharge passage common to said combustion chambers such that combustion gas from a first activated ignition means may flow into the combustion chamber of a later activated ignition means, and at least one flame-transferring preventing means associated with the combustion chamber of said later activated ignition means for obstructing direct flow of said combustion gas from said first activated ignition means into said combustion chamber of said later activated ignition means.

The invention moreover provides a gas generator for an air bag, comprising a cylindrical housing, a first ignition means and a first combustion chamber accommodating a first gas generating agent in one end of said cylindrical housing, and a second ignition means and a second combustion chamber accommodating a second gas generating agent in the other end of said cylindrical housing, a first partition having a first through hole and a second partition having a second through hole defining a space between the first combustion chamber and the second combustion chamber, said space formed in a filter chamber, said filter chamber being provided with a cylindrical filter, said housing having an outer surface having gas discharge ports provided in said outer surface directly facing said cylindrical filter, a flame-transferring preventing means comprising a cap member in said second combustion chamber, the cap member having a closed end surface, a side surface having a plurality of vent holes, and an open end portion opposite said closed end surface, said cap member covering said second through hole at said open end portion, and being fixed onto said second partition wall.

In addition the invention provides a gas generator for an air bag, comprising a cylindrical housing, a first ignition means and a first combustion chamber accommodating a first gas generating agent in one end of said cylindrical housing, and a second ignition means and a second combustion chamber accommodating a second gas generating agent in the other end of said cylindrical housing, a first partition having a first through hole and a second partition having a second through hole defining a space between said first combustion chamber and said second combustion chamber, said space formed between the first partition and said second partition comprising a filter chamber, said filter chamber being provided with a cylindrical filter, said cylindrical housing having an outer surface having gas discharge ports provided in said outer surface directly facing said cylindrical filter, and at least one gas flow diversion member being disposed in said filter chamber to forcibly make said combustion gas flow enter said cylindrical filter when said combustion gas generated in said first combustion chamber flows into said filter chamber from said first through hole.

As a means of solving the problem, the present invention, in other words, provides a gas generator for an air bag, comprising two ignition means each including a combustion chamber with a gas generating agent therein. The two ignition means are capable of being activated separately from each other with a time lag.

The gas generator has a structure including a gas discharge passage common to both combustion chambers such that part of the combustion gas from one chamber flows from the gas discharge passage into the other combustion chamber in the event one of the ignition means is activated first, causing the gas generating agent in the first combustion chamber to ignite and burn first to thereby generate a combustion gas which flows in the gas discharge passage and is discharged from a gas discharge port to inflate an air bag.

At least one flame-transferring preventing means is provided at a position in the passage where the combustion gas flows from the gas discharge passage into the second combustion chamber for obstructing direct advance of the combustion gas flow into that second chamber.

By arranging the flame-transferring preventing means as described above to obstruct direct advance of the combustion gas flow (first combustion gas flow) generated in the one combustion chamber (first combustion chamber) that is ignited and burned first, the malfunction constituting the unwanted ignition of the gas generating agent by the first combustion gas flow is precluded.

Accordingly, by obstructing direct advance of the first combustion gas flow, preferably by diverting the gas flow, the first combustion gas flow strikes repeatedly against component parts, and thereby, the following actions are exhibited:

(i) a flame blocking action in which a flame is blocked so that it cannot reach the second combustion chamber, (ii) a temperature lowering action in which the temperature of the first combustion gas is lowered, and (iii) a mist reduction action in which mists (solid components in the gas generating agent generated by the combustion of the gas generating agent.) For example, metal components contained in the first combustion gas flow are reduced by colliding against a constituent part and adhering thereto.

The ignition and combustion of the gas generating agent in the second combustion chamber is prevented by the flame-transferring prevention action comprising the flame blocking action, gas temperature lowering action and mist reduction action obtained by the flame-transferring preventing means. As a result, a malfunction is prevented and the gas generating agent in the second combustion chamber is normally ignited and burned by the activation of the second ignition means. It should be noted that the mist reduction action obtained by the flame-transferring preventing means provides the additional effect of reducing an amount of mists to flow into the air bag.

The flame-transferring prevention action obtained by this flame-transferring preventing means prevents the ignition and combustion of a gas generating agent in the one combustion chamber caused by the activation of another ignition means not only in the ignition mode such that the two ignition means are activated with a time lag but also in the ignition mode such that only one ignition means is activated and the other ignition means is not activated (when only a small amount of generated gas is sufficient).

Two or more flame-transferring preventing means can be arranged at different positions and, for example, when a plurality thereof are to be arranged, these may be arranged in a communication passage (communication space) located between the first combustion chamber and the second combustion chamber or they may be arranged in the second combustion chamber.

It should be noted that in order to increase or decrease a generated amount of a gas by means of increasing or decreasing a charged amount of a gas generating agent, the width (cross-sectional area) of the gas discharge passage is increased or decreased by changing positions of the flame-transferring preventing means.

In the gas generator for an air bag according to the present invention, one embodiment of the flame-transferring preventing means comprises a combination of a cap member and a gas-flow inhibiting member arranged in the interior of the cap member.

The cap member comprises a closed end surface and a side surface having a plurality of vent holes, an open end portion is provided opposite the closed end surface, and The gas-flow inhibiting member is arranged such that, when a combustion gas (a first combustion gas) flows from the gas discharge passage and enters the cap member through the open end portion thereof, the direction of the first combustion gas flow is changed by the gas-flow inhibiting member and then the gas flow enters, through the vent holes of the side surface, the second combustion chamber in which combustion is to be started with delay.

The flame-transferring preventing means comprises a combination of the cap member and the gas-flow inhibiting member arranged in the interior of the cap member and thereby, a passage through which the first combustion gas flow enters the second combustion chamber and a passage through which a second combustion gas flow reaches a gas discharge port are in a zigzag configuration, so that the flame-transferring prevention action is enhanced.

In another embodiment of the gas generator for an air bag according to the present invention, the flame-transferring preventing means comprises a seal tape, and by the seal tape, the first combustion gas flow is prevented from entering the second combustion chamber.

In another embodiment of the gas generator for an air bag according to the present invention, the flame-transferring preventing means comprise a wire mesh or coolant/filter, so that the first combustion gas flows, through the wire mesh or coolant/filter, into the second combustion chamber.

The flame-transferring prevention action is enhanced by the arrangement of the wire mesh or coolant/filter.

In another embodiment of the gas generator for an air bag according to the present invention, the gas discharge passage comprises a structure for obstructing the direct advance of the first combustion gas flow.

For example, in such a structure an opening is provided at both ends of the space forming the gas discharge passage and the two openings never face each other directly in the axial direction of flow through that passage. Therefore, the first combustion gas flow does not advance directly from the first opening at one end to the second opening at the other end but flows into the opening at the other end after striking against an inner wall surface in which said second opening is defined. Thus, the flame-transferring prevention action is enhanced utilizing these axially offset first and second openings.

In another embodiment of the gas generator for an air bag of the present invention, a coolant/filter is arranged, in addition to the flame-transferring preventing means, in the gas discharge passage that leads to a gas discharge port, and when part of the first combustion gas flows into the second combustion chamber, the first combustion gas is constrained to always pass through the coolant/filter to enter the second combustion chamber because of the action of the flame-transferring means for obstructing a direct advance of the combustion gas flow.

The combustion gas generated in the first combustion chamber passes through the coolant/filter for arresting combustion residues and cooling the gas, which enhances the flame-prevention action. Consequently, even when the first combustion gas enters the other combustion chamber, a gas generating agent stored therein is never ignited and burnt by the first combustion gas.

As another means for solving the problem, the present invention provides a gas generator for an air bag, including: a first ignition means comprising a first combustion chamber accommodating a first gas generating agent in one end of a cylindrical housing, and a second ignition means comprising a second combustion chamber accommodating a second gas generating agent in the other end of a cylindrical housing, a first partition having a first through hole and a second partition having a second through hole defining a space between the first combustion chamber and the second combustion chamber, the space formed between the first partition and the second partition constituting a filter chamber provided with a cylindrical filter, the cylindrical housing having a gas discharge port provided in the housing surface directly facing the cylindrical filter, a cap member being provided as a flame-transferring preventing means in the second combustion chamber, the cap member having a closed end surface and a side surface having a plurality of vent holes, and an opening end portion opposite said closed end surface, the cap member covering the second through hole at the open end portion, and being fixed onto the second partition wall.

Because the first combustion chamber and second combustion chamber are in communication with each other through the filter chamber, part of the first combustion gas flow generated in the first combustion chamber may pass through the filter chamber and flow from the second through hole into the second combustion chamber. In view of the above, by arranging the cap member, which corresponds to the flame-transferring preventing means, in the second through hole, the above flame-transferring prevention action is exhibited.

The flame-transferring prevention action obtained by the flame-transferring preventing means prevents the ignition and burning of the second gas generating agent in the second combustion chamber caused by the activation of the first ignition means, not only in such an ignition mode that a first and a second ignition means are activated with a time lag but also in such an ignition mode that only a first ignition means is activated and a second igniter is not activated (when a small amount of generated gas is sufficient).

It should be noted that, in order to enhance the moisture-proof characteristics of the first combustion chamber and second combustion chamber or to maintain the initial stage pressure of combustion in the respective combustion chambers, the first through hole and second through hole may be closed by respective seal tapes made of aluminum or stainless steel.

In yet another embodiment of the gas generator for an air bag according to the present invention, the flame-transferring preventing means comprises a combination of a cap member and a cylindrical gas-flow inhibiting member arranged in the interior of the cap member, a cylindrical gas-flow inhibiting member is concentrically provided inside the cap member to have a first open end portion facing the second through hole and a second open end portion facing the closed end surface of the cap member, and when the combustion gas flows through the second through hole into the cap member, the flow direction thereof is changed by the gas-flow inhibiting member, and the first gas flow subsequently enters the second combustion chamber through the vent holes in the side surface of the cap member after traversing a zig-zag path.

In still another embodiment of the gas generator for an air bag according to the present invention, the flame-transferring preventing means comprises a wire mesh arranged between the side surface of the cap member and the side surface of the gas-flow inhibiting member, whereby the combustion gas is caused to flow into the other combustion chamber in which the initiation of combustion is delayed after passing through the above wire mesh.

Preferably, the wire mesh is formed cylindrical by laminating a plurality of wire meshes having a loose structure (such as a mesh woven filter formed by compression-molding a plain woven wire mesh, an expanded metal, punched metal or metal lath wire mesh, or a metal wire rod). The flame-transferring prevention action is enhanced by the arrangement of such a wire mesh.

In still another embodiment of the gas generator for an air bag according to the present invention, the flame-transferring preventing means comprises a coolant/filter disposed between the closed end surface of the cap member and the second open end portion of the gas-flow inhibiting member, and the combustion gas is caused to flow through the coolant/filter into the other combustion chamber in which the initiation of combustion is delayed.

It is preferable that the coolant/filter is formed into a disk-like shape by laminating a plurality of loose wire meshes (such as the above loose wire mesh).

The flame-transferring prevention action is enhanced because the temperature of the first combustion gas flow is likely to be further lowered by the arrangement of such a coolant/filter.

In still another embodiment of the gas generator for an air bag according to the present invention, a covering member, which prevents the direct advancement of the combustion gas flow to the second through hole, is provided on the second partition wall surface inside the filter chamber. The flame-transferring prevention action is enhanced by the arrangement of a covering member together with the cap member.

In another embodiment, the gas generator for an air bag of the present invention, no part of the first through hole directly faces any part of the second through hole in the axial direction through the filter chamber.

Most of the first combustion gas flow, entering the filter chamber from the first through hole, flows to the gas discharge port, however, even when part of the combustion gas flows toward the second through hole, it does not advance directly from the first through hole toward the second through hole but flows from the second partition hole to the second combustion chamber after striking against the second partition surface, so that the flame-transferring prevention action is enhanced.

As another means for solving the problem, the present invention provides a gas generator for an air bag, including: a first ignition means comprising a first combustion chamber accommodating a first gas generating agent in one end of a cylindrical housing, and a second ignition means comprising a second combustion chamber accommodating a second gas generating agent in the other end of a cylindrical housing, a first partition having a first through hole and a second partition having a second through hole defining a space between the first combustion chamber and the second combustion chamber, the space formed between the first partition and the second partition constituting a filter chamber provided with a cylindrical filter, the cylindrical housing having a gas discharge port provided in the housing surface directly facing the cylindrical filter, and at least one gas flow diversion member being disposed in the filter chamber to constrain the combustion gas flow to enter the cylindrical filter when the combustion gas generated in the first combustion chamber flows into the filter chamber from the first through hole.

The combustion gas generated in the first combustion chamber is caused therefore, to flow through a filter (coolant/filter), and thereby, the flame-transferring prevention action is enhanced, so that even when the above combustion gas flows in the second combustion chamber, the second gas generating agent therein is never ignited and burnt by the first combustion gas.

In a gas generator for an air bag, a gas flow diversion member comprises a closed end surface and a circumferential surface having a plurality of vent holes, and an open end portion is opposite the closed end surface, a single gas flow diversion member arranged such that a gap corresponding to a passage for gas flow is secured between the second through hole and closed end surface, the circumferential surface abuts against the inner circumferential surface of the cylindrical filter and the diversion member covers the first through hole at the open end portion thereof and is fixed to the first partition wall.

By the arrangement of such a single gas flow diversion member, when the first combustion gas generated in the first combustion chamber flows from the first through hole into the filter chamber, the first combustion gas is constrained to flow through the holes in the circumferential surface of the gas flow diversion member towards the cylindrical filter. Most of the gas is discharged, after being filtered and cooled, through the gas discharge port. Part of the gas is not discharged through the gas discharge port, however, and it flows into the second combustion chamber through the second through hole. Even in such a case, because of the flame-transferring prevention action provided by the cylindrical filter, the second gas generating agent is never ignited and burned by the first combustion gas. It should be noted that, when a single gas flow diversion member is used, it may also be arranged at the second through hole.

In a gas generator for an air bag of the present invention, two gas flow diversion members is provided:

a first gas flow diversion member, which comprises a closed end surface, a circumferential surface having a plurality of vent holes and an open end portion opposite the closed end surface, is arranged such that the circumferential surface abuts against the inner circumferential surface of the cylindrical filter and the diversion member covers the first through hole at its open end portion and is fixed to the first partition wall, a second gas flow diversion member, which comprises a closed end surface, a circumferential surface having a plurality of vent holes and an open end portion, opposite the closed end surface, is arranged such that the circumferential surface abuts against the inner circumferential surface of the cylindrical filter and the diversion member covers the second through hole at its open end portion and is fixed to the second partition wall, and the closed end surface of the first gas flow diversion member and the closed end surface of the second gas flow diversion member abut one another.

By the arrangement of these two gas flow diversion members, when the combustion gas generated in the first combustion chamber flows from the first through hole into the filter chamber, the combustion gas flow is forcibly caused to flow through the holes in the circumferential surface of the first diversion member to the cylindrical filter. In addition, most of the gas is discharged, after being filtered and cooled, through the gas discharge port, but, even if part of the gas is not discharged through the gas discharge port, the gas does not ignite nor burn the second gas generating agent because of the flame-transferring prevention action obtained by the filter and the suppressing action, obtained by the second gas diversion member, on an amount of gas flowing from the second through hole to the second combustion chamber.

The first and second gas flow diversion members are provided with flange portions at the open end portions thereof, so that the first and second diversion members are disposed by sandwiching the flange portion between the first partition wall or the second partition wall and the cylindrical filter, respectively.

In a gas generator for an air bag of the present invention, a cap member corresponding to a flame-transferring preventing means is further arranged in the second combustion chamber, and this cap member, which comprises a closed end surface, a side surface having a plurality of vent holes and an open end portion opposite the closed end surface, covers the second through hole at the open end portion side and is fixed to the second partition wall.

The flame-transferring prevention action is further enhanced by the combination of a gas flow diversion member and the cap member.

The gas generator for an air bag of the present invention can be applied in a variety of well known gas generators used in automobile air bag systems.

The gas generator for an air bag of the present invention comprises a flame-transferring preventing means providing a flame-transferring prevention action that comprises a flame blocking action, a gas temperature lowering action and a mist reduction action obtained by the flame-transferring preventing means is exhibited, even when a first combustion gas generated in a first combustion chamber flows into a second combustion chamber, such a malfunction does not occur that the gas generating agent in the second combustion chamber is ignited and burnt by that first combustion gas.

DETAILED DESCRIPTION OF THE PRESENT INVENTION (1) First Embodiment

Figure 1:
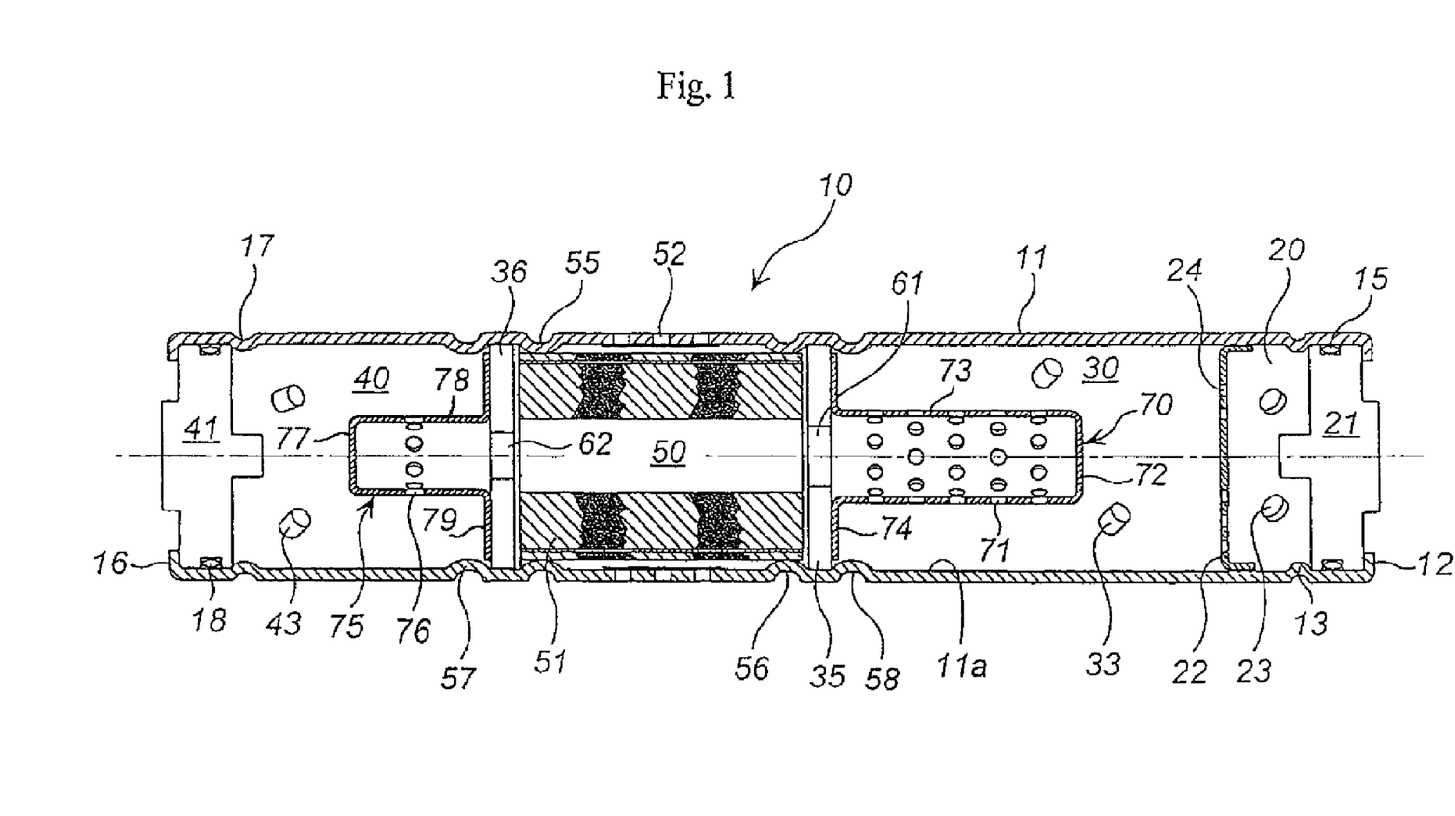
FIG. 1 is an axial cross-sectional view of a gas generator for an air bag.
Figure 2:
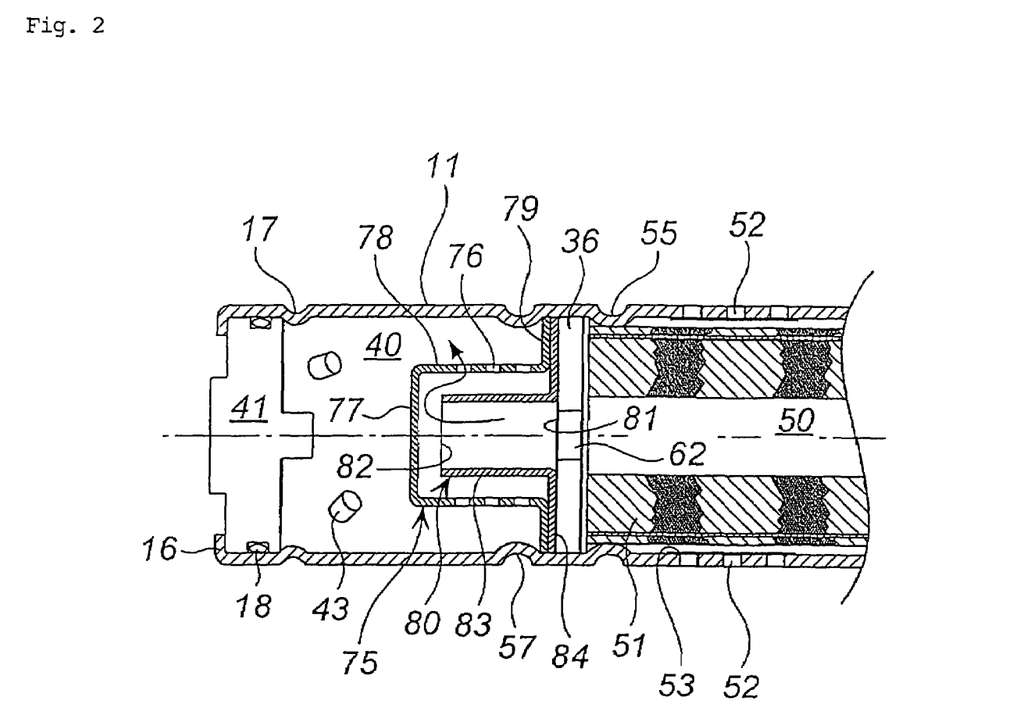
FIG. 2 is a partial cross-sectional view of FIG. 1.

With reference to FIG. 1 and FIG. 2, a gas generator for an air bag including a flame-transferring preventing means will be described. FIG. 1 is a cross-sectional view in the axial direction of the gas generator, and FIG. 2 is a partial cross-sectional view of FIG. 1.

A first ignition chamber 20 of a first igniter 21 and a first combustion chamber 30 are axially arranged in one end of a cylindrical housing 11. The diametric cross-sectional shape of the cylindrical housing 11 is not limited to a circular shape, but may be an elliptical or polygonal shape.

The first ignition chamber 20 is defined by a retainer 22, the cylindrical housing 11, and the first igniter 21.

The first igniter 21 is fixed between a crimped portion 12 in the end peripheral edge of the cylindrical housing 11 and an inboard annular crimped portion 13. An O-ring 15 surrounds the first igniter 21 for moisture-proofing the end structure of the housing 11.

The retainer 22 is press-inserted into the cylindrical housing 11 and, although it cannot be moved towards the first igniter 21 due to the annular crimped portion 13, it is formed to be movable in the opposite direction.

A transfer charge 23 is stored in the first ignition chamber 20 (for example, a well-known transfer charge such as B/KNO$_3$, or a molded article of gas generating composition formed into the desired shape, having a combustion temperature of 1700 to 3000° C.).

A first combustion chamber 30 is defined by the retainer 22, the cylindrical housing 11 and a first partition wall 35 spaced from the retainer 23 within the housing 11. A first gas generating agent 33 is stored in the first combustion chamber 30 (for example, a molded article of gas generating composition formed into the desired shape, having a combustion temperature of 1000 to 1700° C.). A desired volume of the first combustion chamber 30 can be obtained by adjusting the axial position of the retainer 22.

The first ignition chamber 20 and the first combustion chamber 30 are in communication with each other through a plurality of communication holes 24 provided in the retainer 22.

A second combustion chamber 40 is arranged in the other end of the cylindrical housing 11. A second igniter 41 is accommodated in the second combustion chamber 40 and is fixed by a crimped portion 16 in the other end peripheral edge of the cylindrical housing 11 and an inboard annular crimped portion 17. An O-ring 18 is provided around the igniter 41 for moisture-proofing the closed other end of the cylindrical housing 11.

A second gas generating agent 43 (for example, a molded article of gas generating composition formed into the desired shape, having a combustion temperature of 1000 to 1700° C.) is stored in the second combustion chamber 40.

A filter chamber 50 sandwiched between the first partition wall 35 and a second partition wall 36 within the housing 11 is provided in the central portion of the cylindrical housing 11. The first partition wall 35 and second partition wall 36 are fixed in the housing by crimping the cylindrical housing 11 (crimped portions 56, 58 and crimped portions 55, 57).

A hollow cylindrical filter 51 is disposed in the filter chamber 50 in the axial direction of the housing, and a plurality of gas discharge ports 52 are provided in a wall surface of the cylindrical housing 11 facing the cylindrical filter 51.

The cylindrical filter 51 is press-supported in the diametral direction at two positions by the annular crimped portions 55, 56, and, because of these two annular crimped portions 55, 56, a gap is provided between the outer circumferential surface of the annular filter 51 and the inner wall surface 11a of the cylindrical housing 11 through which are provided a plurality of gas discharge ports 52.

In order to enhance the moisture-proof in the first combustion chamber 30 and the second combustion chamber 40, the plurality of gas discharge ports 52 are covered by an aluminum or stainless steel seal tape 53.

A single first through hole 61, which corresponds to an entrance to a gas discharge passage extending from the first combustion chamber 30, through the annular filter 51, to the gas discharge ports 52, is provided in the first partition wall 35. The first through hole 61 is covered by a first cap member 70 on the first combustion chamber 30 side of the partition 35. The first cap member 70 comprises an end surface 72 and a side surface 73. The opposite side of the cap member from the end surface 72 is open, and a plurality of vent holes 71 are provided in the side surface 73. A cross sectional shape of the first cap member 70 is not limited to a circular shape but may be an elliptical or polygonal shape.

The first cap member 70 comprises a flange portion 74 around its peripheral edge, and the flange portion 74 and the first partition wall 35 are fixed together by a crimp 58 in the cylindrical housing 11.

A second through hole 62, which corresponds to an entrance to a gas discharge passage extending from the second combustion chamber 40 through the hollow cylindrical filter 51 to the gas discharge port 52, is provided in the second partition wall 36, and while the diameter of the second through hole 62 is set to be smaller than the diameter of the first through hole 61, both diameters are smaller than the inner diameter of the axial passage in the hollow cylindrical filter 51.

The second through hole 62 is covered by a second cap member 75 on the second combustion chamber 40 side of the partition member 36. The second cap member 75 comprises an end surface 77 and side surface 78, the opposite end of the second cap member being open at the second through hole 62, and a plurality of vent holes 76 are provided in the side surface 78. The cross sectional shape of the second cap member 75 is not limited to a circular shape but may be an elliptical or polygonal shape. The second cap member 75 comprises a flange portion 79 at its open end adjacent the inner wall of the partition member 36.

A cylindrical gas-flow inhibiting member 80, open at both ends, is disposed inside the second cap member 75, and this assembly functions as a flame-transferring preventing means.

In the cylindrical gas-flow inhibiting member 80, one open end portion 81 faces the second through hole 62 and the other open end portion 82 faces the inner end surface 77 of the cap member 75. The inhibiting member is arranged concentrically with the second cap member 75. The gas-flow inhibiting member 80 comprises a flange portion 84 about the peripheral edge of the one open end portion 81, the flange portion 84 being sandwiched between the flange portion 79 on the second cap member 75 and the inner wall surface of the partition member 36. This structure is held in place by the crimp 57 in the cylindrical housing 11.

Since the circumferential surface 83 of the cylindrical gas-flow inhibiting member 80 and the side surface 78 of the second cap member 75 are directly opposite to each other, the circumferential surface 83 and vent holes 76 are also directly opposite to each other. A gap is provided between the other end opening portion 82 and the closed end surface 77, and the interval of this gap is adjusted in accordance with the amount of a combustion gas to be generated in the second combustion chamber 40.

In this embodiment, in order to adjust the combustibility of the second gas generating agent 43 in the second combustion chamber 40 by the second though hole 62, the total opening area of the vent holes 76, the cross-sectional area of the circumferential surface 83 of the gas-flow inhibiting member 80 and the side surface 78 of the cap member 75 and the cross-sectional area between the peripheral edge of the other end opening portion of the gas-flow inhibiting member 80 and the closed end surface 77 of the cap member 75 are all formed larger than the opening area of the second through hole 62.

It should be noted that, in this embodiment, a member identical to the gas-flow inhibiting member 80 can also be arranged in the first cap member 70. In this case, mainly, a mist reduction action is exhibited.

Next, with reference to FIG. 1 and FIG. 2, an operation of the gas generating agent 10 when assembled in an air bag system installed in an automobile will be described. In the following, a case in which the first igniter 21 and the second igniter 41 are activated with a slight time lag is described. The arrow in FIG. 2 illustrates a first combustion gas flow.

At the vehicle collision, the first igniter 21 is activated to ignite and burn the transfer charge 23, so that an ignition energy (a high temperature gas or flame) is generated. This ignition energy flows through the through holes 24 into the first combustion chamber 30 to ignite and burn the first gas generating agent 33.

The first combustion gas generated by the combustion of the first gas generating agent 33 flows through the vent holes 71 into the first cap member 70, passes through the first through hole 61, and then flows into the filter chamber 50. Thereafter, the first combustion gas is cooled and the combustion residue thereof is filtered as it passes through the cylindrical filter 51, the gas breaks the seal tape 53 and is discharged through the gas discharge ports 52 to inflate an air bag.

In such a discharging process of the first combustion gas, part of the first combustion gas sometimes flows from the filter chamber 50 into the second through hole 62. At this time, because of the existence of the cylindrical gas inhibiting member 80 arranged in the second cap member 75, the first combustion gas does not advance directly to the vent holes 76 but flows through the vent holes 76 into the second combustion chamber 40 after it strikes against the closed end surface 77 of the second cap member 75 and changes its direction.

As described above, the first combustion gas does not advance directly but advances in a zigzag way, and therefore, the flame-preventing action is exhibited in this process. Consequently, the second gas generating agent 43 is never ignited and burnt by the first combustion gas flowing into the second combustion chamber 40.

When the second igniter 41 is activated later, the second gas generating agent 43 is ignited and burned to generate a second combustion gas. The second combustion gas (which includes the first combustion gas that has flowed into the second combustion chamber 40) flows through the vent holes 76 into the second cap member 75, passes through a zigzag passage because of the presence of the cylindrical gas-flow inhibiting member 80, and then flows from the second through hole 62 into the filter chamber 50. At this time, the second combustion gas strikes against the second cap member 75 and the cylindrical gas-flow inhibiting member 80, so that mists are collected and the amount thereof is reduced.

Thereafter, the second combustion gas is cooled and the combustion residues thereof are filtered as it passes through the cylindrical filter 51, and it is then discharged through the gas discharge port 52 to further inflate the air bag.

(2) Second Embodiment

A gas generator for an air bag including a flame-transferring preventing means will be described with reference to FIG. 1 and FIG. 3.

Figure 3:
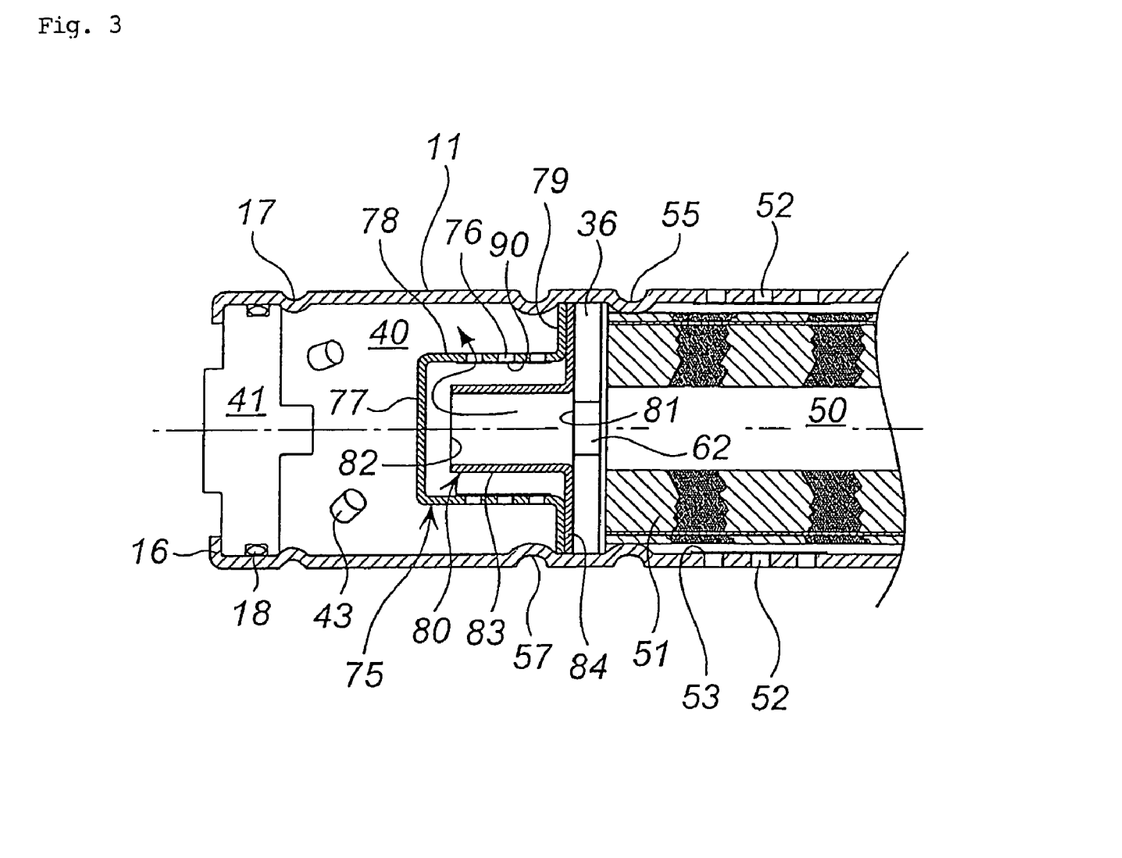
FIG. 3 is a partial enlarged cross-sectional view of an embodiment of a gas generator for an air bag different from FIG. 1.

FIG. 3 is a partial cross sectional view of a gas generator of a different embodiment from FIG. 1. The arrow in FIG. 3 indicates a first combustion gas flow.

The basic structure of the gas generator of FIG. 3 is identical to that of FIG. 2, except for a sealing tape 90 closing, from the inside, all or part (preferably all) of the vent holes 76 in the second cap member 75.

When the first combustion gas enters the second cap member 75, its flow direction is changed because of the existence of the cylindrical gas-flow inhibiting member 80 (in other words, a gas-flow force is weakened), and thereafter, the seal tape prevents the combustion gas from flowing into the second combustion chamber 40. Even if the seal tape 90 is ruptured by the first combustion gas, the first combustion gas that has flowed into the second combustion chamber 40, does not ignite and burn the second gas generating agent 43 because of the flame-transferring prevention action of the second cap member 75. The seal tape 90 is easily ruptured by the second combustion gas.

It should be noted that, in this embodiment, a member identical to the gas-flow inhibiting member 80 can also be disposed in the first cap member 70 shown in FIG. 1. In this case, mainly, the mist reduction action is exhibited.

(3) Third Embodiment

Figure 4:
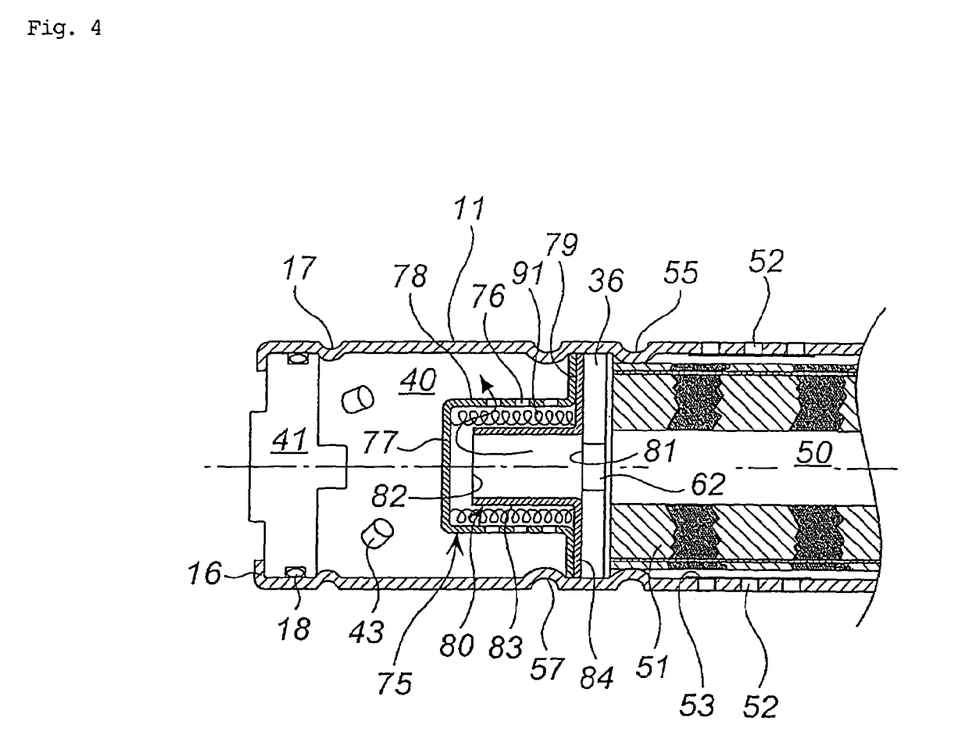
FIG. 4 is a partial enlarged cross-sectional view of an embodiment of a gas generator for an air bag different from FIG. 1.

A gas generator for an air bag including a flame-transferring preventing means will be described with reference to FIG. 1 and FIG. 4. FIG. 4 is a partial cross sectional view of a gas generator of a different embodiment from FIG. 1. The arrow in FIG. 4 indicates a first combustion gas flow.

The basic structure of the gas generator of FIG. 4 is identical to that of FIG. 2, except for a wire mesh 91 provided inside the second cap member 75.

The wire mesh 91 is a cylinder formed by laminating a plurality of compression-molded mesh woven filters made of, for example, a plain woven wire mesh, an expanded metal, punched metal or metal lath wire mesh or a wire rod, and the wire mesh 91 is arranged between the side surface 78 of the second cap member 75 and the circumferential surface 83 of the cylindrical gas-flow inhibiting member 80.

When the first combustion gas enters the second cap member 75, its flow direction is changed because of the existence of the cylindrical gas-flow inhibiting member 80 (in other words, a gas-flow force is weakened), and thereafter, the first combustion gas flows into the second combustion chamber 40. In this process, the flame-transferring prevention action is exhibited since the gas passes through the wire mesh 91, and therefore, the second gas generating agent 43 is never ignited and burnt.

It should be noted that, in this embodiment, a member identical to the gas-flow inhibiting member 80 can also be arranged in the first cap member 70. In this case, mainly, the mist reduction action is exhibited.

(4) Fourth Embodiment

Figure 5:
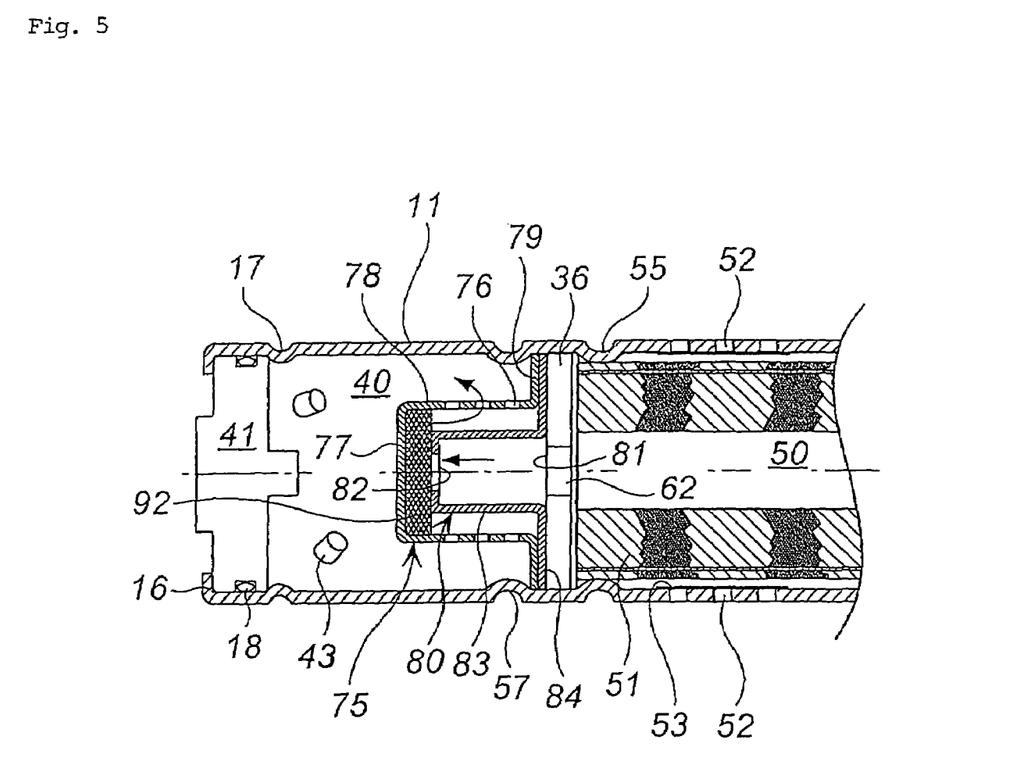
FIG. 5 is a partial enlarged cross-sectional view of an embodiment of a gas generator for an air bag different from FIG. 1.

A gas generator for an air bag including a flame-transferring preventing means will be described with reference to FIG. 1 and FIG. 5. FIG. 5 is a partial cross sectional view of a gas generator of a different embodiment from FIG. 1. The arrow in FIG. 5 indicates a first combustion gas flow.

The basic structure of the gas generator of FIG. 5 is identical to that of FIG. 2, except for a coolant/filter 92 provided inside the closed end 77 of the second cap member 75.

The coolant/filter 92 is a cylinder formed by laminating a plurality of compression-molded mesh woven filters made of, for example, a plain woven wire mesh, an expanded metal, punched metal or metal lath wire mesh or a wire rod, and the coolant/filter 92 is disposed between the closed end surface 77 of the second cap member 75 and the other open end 82 of the cylindrical gas-flow inhibiting member 80.

When the first combustion gas enters the second cap member 75, the gas passes through the coolant/filter 92 in the process in which its flow direction is changed because of the existence of the cylindrical gas-flow inhibiting member 80, and then the first combustion gas flows into the second combustion chamber 40. In this process, the flame-transferring prevention action is exhibited, and therefore, the second gas generating agent 43 is never ignited and burnt.

If desired, the other open end 82 of the flow inhibiting member 80 may be constricted to a desired degree such as by an inwardly projecting flange 82'.

The Embodiment in which the coolant/filter 92 is used is suitable when an amount of the first combustion gas generated in the first combustion chamber 20 is particularly large (that is, when a pressure produced by the first combustion gas is large). It should be noted that, in this embodiment, a member identical to the gas-flow inhibiting member 80 can also be arranged in the first cap member 70. In this case, mainly, the mist reduction action is exhibited.

(5) Fifth Embodiment

Figure 6:
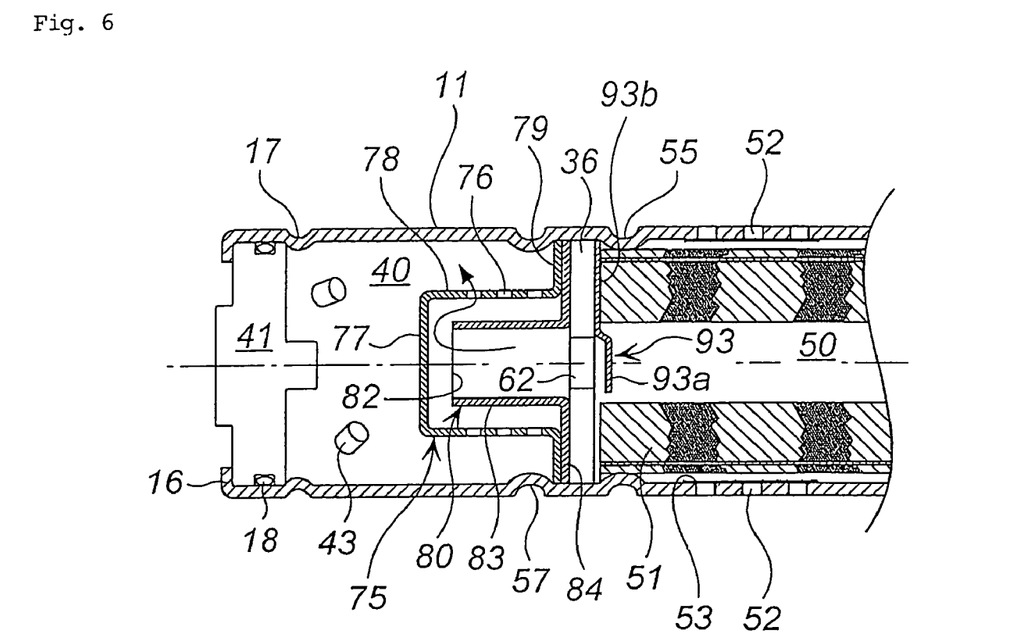
FIG. 6 is a partial enlarged cross-sectional view of an embodiment of a gas generator for an air bag different from FIG. 1.

A gas generator for an air bag including a flame-transferring preventing means will be described with reference to FIG. 1 and FIG. 6. FIG. 6 is a partial cross sectional view of a gas generator of a different embodiment from FIG. 1. The flow arrow in FIG. 6 indicates a first combustion gas flow.

The basic structure of the gas generator of FIG. 6 is identical to that of FIG. 2, except for a baffle member which is provided at the second partition wall inside the filter chamber 50 to prevent the first combustion gas flow from advancing directly to the second through hole 62.

The baffle member 93 comprises a disk portion 93a and a support portion 93b larger than the second through hole 62. The support portion 93b is press-supported between the end surface of the cylindrical filter 51 and the second partition wall 36 by the crimp 55 in the cylindrical housing 11. The disk portion 93a is held by the support portion 93b such that a gap is obtained between the portion 93a and the second through hole 62 and that the peripheral edge portion is prevented from abutting against the inner circumferential surface of the cylindrical filter 51.

The first combustion gas, which has entered the filter chamber 50, strikes against the baffle member 93, and its flow is then disturbed, so that the amount of first combustion gas to enter the second cap member 75 is reduced from that in the first embodiment. In the same way as the first embodiment, a flame-transferring prevention action is exhibited when the first combustion gas enters the second cap member 75. It should be noted that, in this embodiment, a member identical to the gas-flow inhibiting member 80 can also be arranged in the first cap member 70. In this case, mainly, the mist reduction action is exhibited.

(6) Sixth Embodiment

Figure 7:
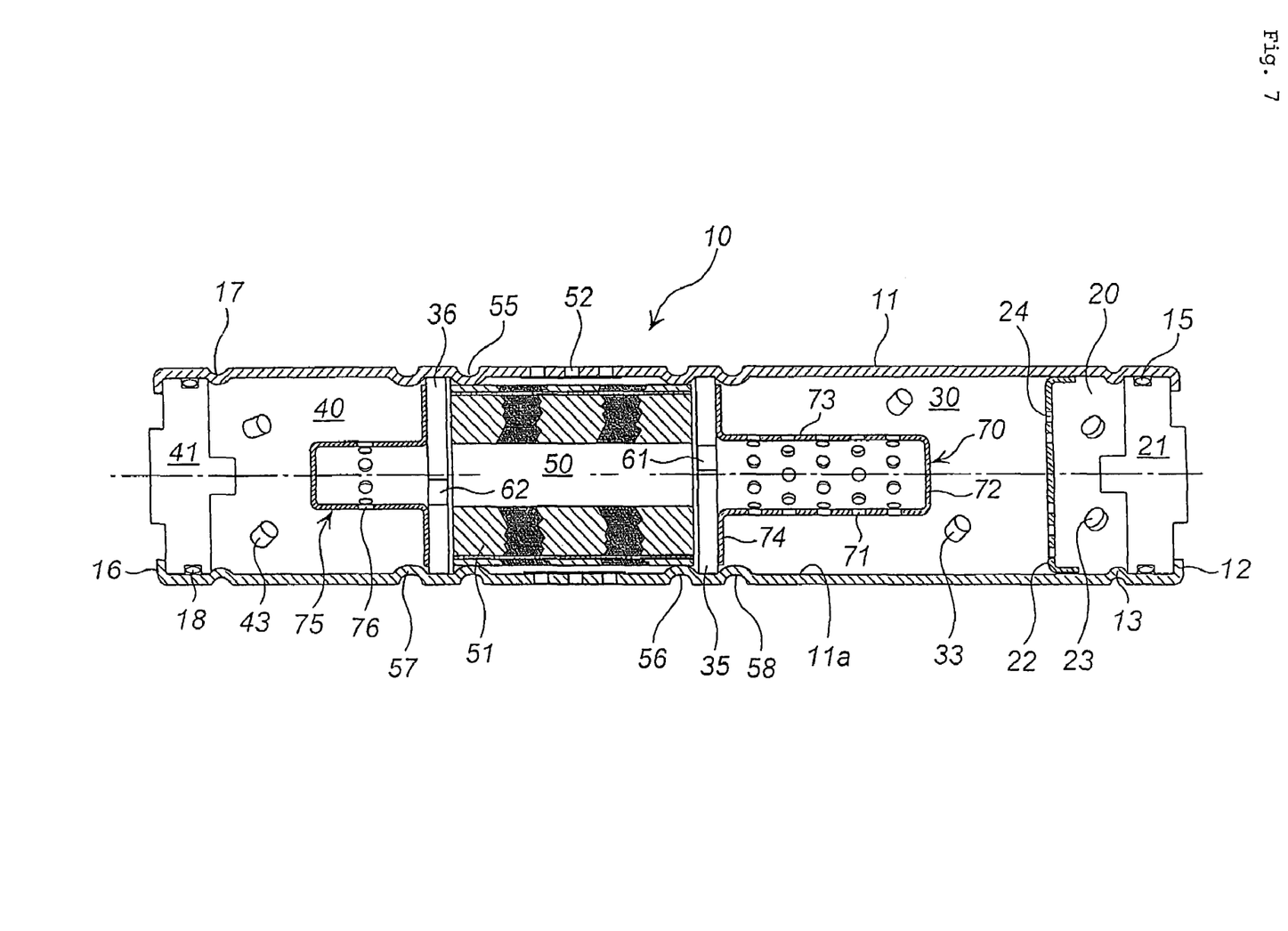
FIG. 7 is an axial cross-sectional view of an embodiment of a gas generator for an air bag different from FIG. 1.

A gas generator for an air bag including a flame-transferring preventing means will be described with reference to FIG. 1 and FIG. 7. FIG. 7 is a cross sectional view of a gas generator of a different embodiment from FIG. 1.

The basic structure of the gas generator of FIG. 7 is identical to that of FIG. 1, except that all of the first through holes provided in the first partition wall portion 35 and all of the second through holes provided in the second partition wall 36 are offset from each other in the axial direction.

Most of the first combustion gas flow, which has flowed from the first through hole 61 into the filter chamber 50, flows to the gas discharge port 52, and even if part of the combustion gas flows toward the second through hole 62, it does not advance directly from the first through hole 61 to the second through hole 62 but flows from the second through hole 62 into the second cap member 75 after having collided with the surface of the second partition wall 36.

Because the flow of the first combustion gas, which has flowed into the filter chamber 50, is disturbed as it collides with the surface of the second partition wall 36, the amount of first combustion gas entering the second cap member 75 is reduced from that in the first embodiment. It should be noted that, in the same way as the first embodiment, a flame-transferring preventing action is exhibited when the first combustion gas enters the second cap member 75. In this embodiment, a member identical to the gas-flow inhibiting member 80 can also be arranged in the first cap member 70. In this case, mainly, the mist reduction action is exhibited.

(7) Seventh Embodiment

Figure 8:
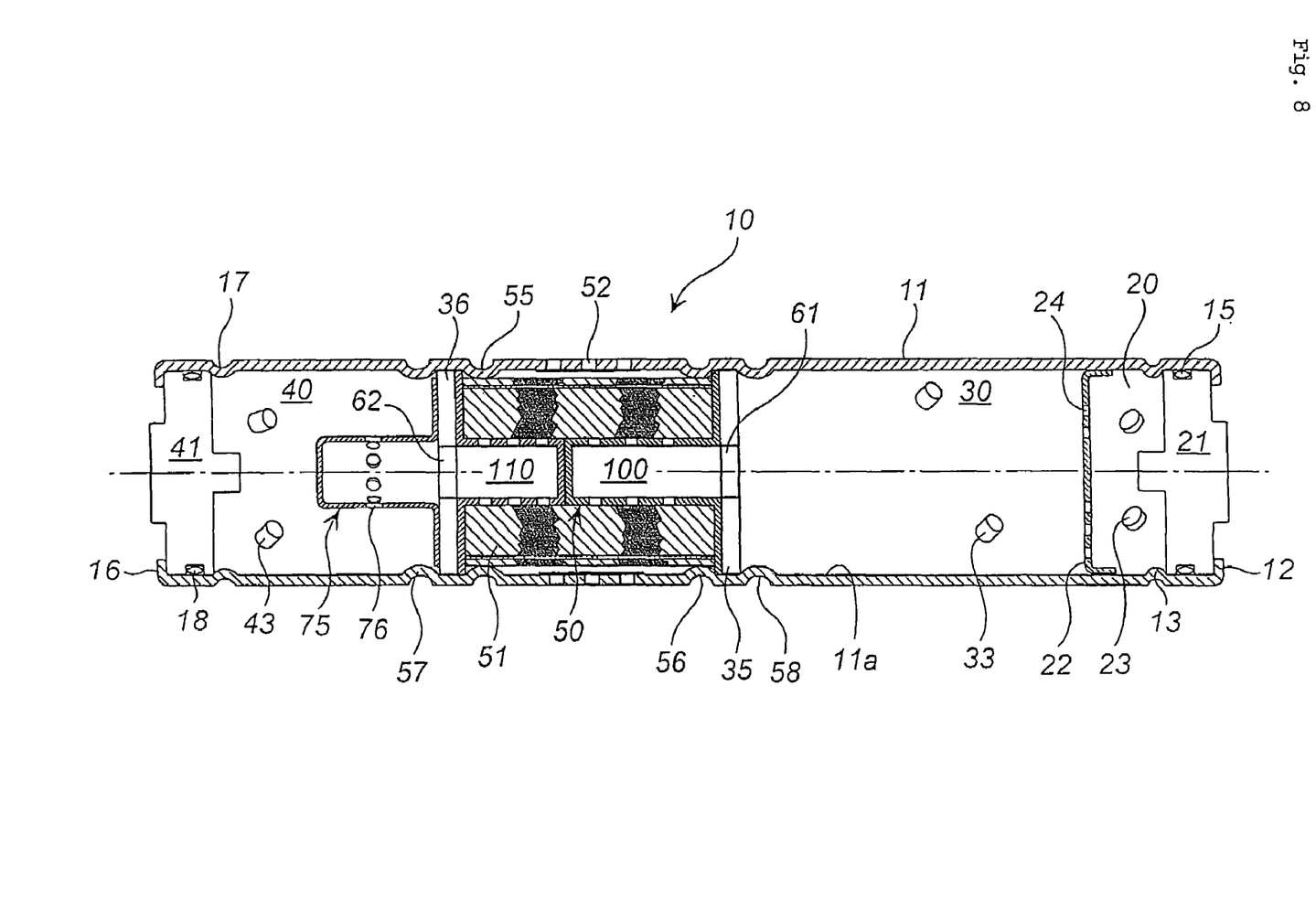
FIG. 8 is an axial cross-sectional view of an embodiment of a gas generator for an air bag different from FIG. 1.
Figure 9:
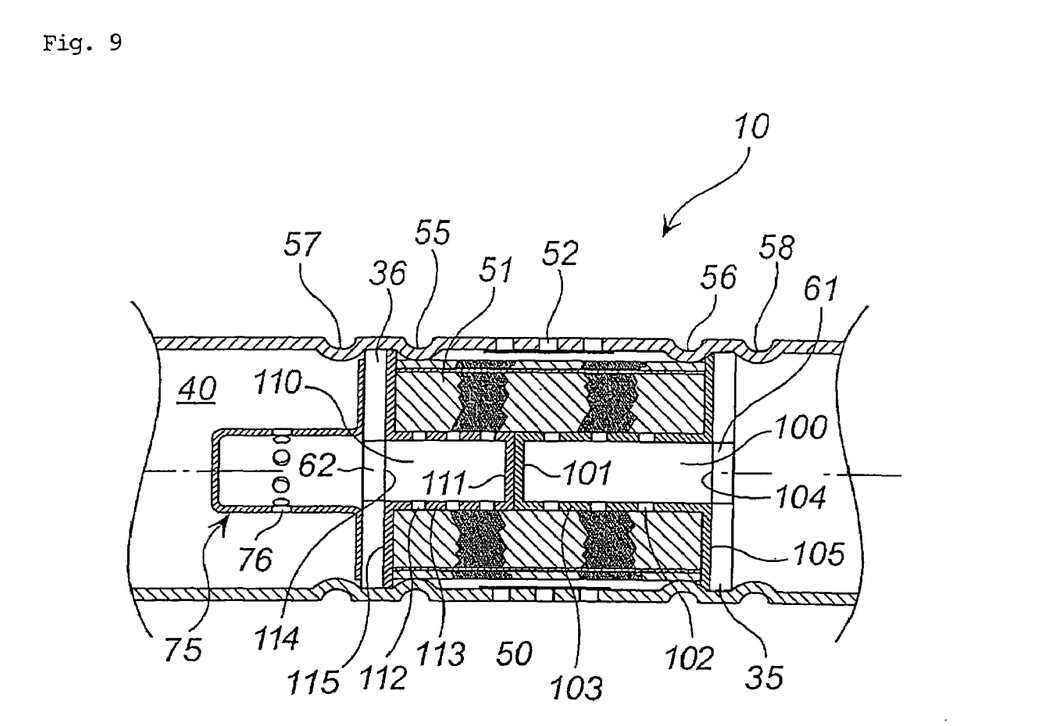
FIG. 9 is a partial enlarged view of FIG. 8.

A gas generator for an air bag including a flame-transferring preventing means will be described with reference to FIG. 8 and FIG. 9. FIG. 8 is a cross sectional view of a gas generator of a different embodiment from FIG. 1, and FIG. 9 is a partial enlarged view of FIG. 8. The basic structure of the gas generator of FIG. 8 is identical to that of FIG. 1, so that only those parts different from FIG. 1 will be described.

A first gas flow diversion member 100 and second gas flow diversion member 110 are adjacently disposed in the axial direction inside the filter chamber 50. It is desirable that the volume ratio of the first gas flow diversion member 100 and second gas flow diversion member 110 be proportional, respectively, to the amounts of gases generated in the first combustion chamber 30 and the second combustion chamber 40.

The first gas flow diversion member 100 comprises a closed end surface 101 and a circumferential surface 103 having a plurality of vent holes 102, an opening portion 104 is provided opposite the closed end surface 101, and a flange portion 105 is provided about the outer periphery of the opening 104.

The circumferential surface 103 abuts against the inner circumferential surface of the hollow cylindrical filter 51 and surrounds the first through hole 61 at the open end 104. The flange portion 105 is sandwiched between the first partition wall 35 and an end surface of the cylindrical filter 51 and is fixed together with the first partition wall 35 by the crimped portions 56, 58. The flange portion 105 may be fixed to the first partition wall 35 by welding instead of crimping.

The second gas flow diversion member 110 comprises a closed end surface 111 and a circumferential surface 113 having a plurality of vent holes 112, an open end 114 opposite the closed end surface 111, and a flange portion 115 about the external periphery of the open end 114.

The circumferential surface 113 abuts against the inner circumferential surface of the hollow cylindrical filter 51 and surrounds the second through hole 62 at the open end 114. The flange portion 115 is sandwiched between the second partition wall 36 and the end surface of the cylindrical filter 51 and is fixed together with the second partition wall 36 by crimped portions 55, 57. The flange portion 115 may be fixed to the second partition wall 36 by welding instead of crimping.

The closed end surface 101 of the first gas flow diversion member 100 and the closed end surface 111 of the second gas flow diversion member 110 are abutted.

It should be noted that if desired only one of the first gas flow diversion member 100 and the second gas flow diversion member 110 may be utilized. In addition, the embodiments of FIG. 8 and FIG. 9 do not comprise the first cap member 71 in FIG. 1.

The combustion gas generated in the first combustion chamber 30 flows from the first through hole 61 into the first gas flow diversion member 100, and because the movement thereof in the axial direction is inhibited by the first gas flow diversion member 100 and the second gas flow diversion member 110, the combustion gas flows through the vent holes 102 of the circumferential surface 103 into the cylindrical filter 51. Thereafter, most of the combustion gas is discharged through the gas discharge port 52 to inflate the air bag, but sometimes, part of the combustion gas moves axially inside the cylindrical filter 51 and flows through the vent holes 112 of the circumferential surface 113 into the second gas flow diversion member 110. Thereafter, passing through the second through hole 62 and the cap member 75, the combustion gas flows into the second combustion chamber 40.

The flame-preventing action by the cylindrical filter 51 is exhibited (cooling of first combustion gas and capture of mists contained in the gas) in this process, and an amount of flow into the second gas flow diversion member 110 is suppressed by the circumferential surface 113 and the vent holes 112. Furthermore, the flame-preventing action by the cap member 75 is also exhibited.

As a result, even if the combustion gas flows into the second combustion chamber 40, the second gas generating agent 43 is not ignited and burned. In addition, not only in the case such that the second igniter 41 is activated later but also in the case such that only the first igniter 21 is activated, the second gas generating agent 43 is never ignited and burned.

The invention claimed is:

1. A gas generator for an air bag, comprising:
a housing including a gas discharge port;
first and second ignition means provided within the housing;
a combustion chamber including a first gas generating agent that generates a first combustion product;
a filter chamber provided within the housing and accommodating therein a cylindrical filter;
defining means defining the combustion chamber, and being provided, within the housing, next to the cylindrical filter; and
flame-transferring preventing means including,
a first member attached to the defining means and having a cup-shaped configuration including a first circumferential wall, a first bottom including an opening, and a first open end opposite to the first bottom, and
a second member including a surface and provided such that the surface opposes the opening of the first member.

2. A gas generator according to claim 1, wherein the second member is provided within the housing such that the second member is attached to the first member.

3. A gas generator according to claim 2, wherein the first member includes a first flange attached to the defining means, and the second member has a cup-shaped configuration including a second circumferential wall, a second bottom, a second open end, and a second flange at an peripheral edge of the second open end.

4. A gas generator according to claim 1, wherein the first member and the second member provide a tortuous path from the filter chamber to the combustion chamber.

5. A gas generator according to claim 1, further comprising:
a second gas generating agent that generates a second combustion product,
wherein the cylindrical filter is common to the first combustion product and the second combustion product.

6. A gas generator for an air bag, comprising:
first ignition means;
second ignition means;
a first combustion chamber including a first gas generating agent ignited by the first ignition means;
a second combustion chamber including a second gas generating agent ignited by the second ignition means, the second ignition means being activated after activation of the first ignition means with a time lag to inflate an air bag;
a gas discharge passage common to said first combustion chamber and said second combustion chamber, such that combustion gas from said first combustion chamber may flow into the second combustion chamber even when the second ignition means is not activated; and
at least one flame-transferring preventing means associated with the second combustion chamber for obstructing direct flow of said combustion gas from said first combustion chamber into said second combustion chamber,
wherein said at least one flame-transferring preventing means comprises a combination of a cap member and a gas-flow inhibiting member arranged in the interior of said cap member,
said cap member comprises a closed end surface and a side surface having a plurality of vent holes, and open end opposite said closed end surface, said open end communicating with said gas discharge passage, and
said gas-flow inhibiting member is arranged such that, when a combustion gas flows from the gas discharge passage and enters the cap member through the open end of said cap member, the direction of the combustion gas flow is changed and subsequently enters, through the vent holes of said side surface, said second combustion chamber.

7. The gas generator for an air bag according to claim 6, wherein said at least one flame-transferring preventing means further comprises a seal tape preventing the combustion gas from entering said second combustion chamber.

8. The gas generator for an air bag according to claim 6, wherein the at least one flame-transferring preventing means comprise one of a wire mesh and a coolant/filter impeding combustion gas from flowing therethrough into said second combustion chamber.

9. The gas generator for an air bag according to claim 6, wherein said gas discharge passage includes structure for obstructing the direct advance of said combustion gas flow.

10. A gas generator for an air bag, comprising:
a cylindrical housing;
a first ignition means and a first combustion chamber accommodating a first gas generating agent in one end of said cylindrical housing; and
a second ignition means and a second combustion chamber accommodating a second gas generating agent in the other end of said cylindrical housing;
a first partition having a first through hole and a second partition having a second through hole defining a space between the first combustion chamber and the second combustion chamber,
said space formed into a filter chamber, and said filter chamber being provided with a cylindrical filter, and said housing having an outer surface having gas discharge ports provided in said outer surface directly facing said cylindrical filter; and flame-transferring preventing means including a cap member in said second combustion chamber, the cap member having a closed end surface, a side surface having a plurality of vent holes, and an open end portion opposing said closed end surface, said cap member covering said second through hole at said open end portion, and being fixed onto said second partition wall.

11. The gas generator for an air bag according to claim 10, wherein the flame-transferring preventing means comprises, in combination with said cap member, a cylindrical gas-flow inhibiting member arranged in the interior of the cap member, said cylindrical gas-flow inhibiting member being concentrically disposed inside the cap member and having a first open end portion facing said second through hole and a second open end portion facing said closed end surface of said cap member, such that when combustion gas flows through said second through hole into said cap member, the direction thereof is changed prior to said gas entering said second combustion chamber through said vent holes in said side surface of said cap member.

12. The gas generator for an air bag according to claim 10 or 11, wherein said flame-transferring preventing means comprises a seal tape, and said vent holes of said cap member are closed by said seal tape.

13. The gas generator for an air bag according to claim 11, wherein said flame-transferring preventing means comprises a wire mesh arranged between said side surface of said cap member and said gas-flow inhibiting member, whereby combustion gas is caused to flow into said second combustion chamber through said wire mesh.

14. The gas generator for an air bag according to claim 11, wherein said flame-transferring preventing means comprises a coolant/filter disposed between said closed end surface of said cap member and said second open end of said gas-flow inhibiting member, whereby combustion gas is caused to flow through said coolant/filter into said second combustion chamber.

15. The gas generator for an air bag according to claim 10 or 11, further comprising:

a cover member, preventing the direct advancement of combustion gas flow to said second through hole, provided on said second partition wall inside said filter chamber.

16. The gas generator for an air bag according to claim 10 or 11, wherein no part of said first through hole directly faces any part of said second through hole axially of said filter chamber.

* * * * *